United States Patent
Lim et al.

(10) Patent No.: US 7,535,518 B2
(45) Date of Patent: May 19, 2009

(54) METHOD AND APPARATUS FOR DISPLAYING DIGITAL BROADCASTING

(75) Inventors: Dae jin Lim, Gyeonggi-do (KR); Eun Yeung Chang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 10/667,375

(22) Filed: Sep. 23, 2003

(65) Prior Publication Data

US 2005/0073609 A1    Apr. 7, 2005

(30) Foreign Application Priority Data

Nov. 8, 2002    (KR) ..................... 10-2002-0069071

(51) Int. Cl.
H04N 5/46    (2006.01)
H04N 3/27    (2006.01)

(52) U.S. Cl. .................. 348/731; 348/555; 348/725; 348/563; 348/570; 725/38; 725/48

(58) Field of Classification Search .............. 348/731, 348/729, 555, 554, 558, 563, 564, 565, 569, 348/570, 725; 725/59, 48, 40, 38

See application file for complete search history.

(56) References Cited

U.S. PATENT DOCUMENTS

| 6,169,569 | B1 * | 1/2001 | Widmer et al. ............... 725/111 |
| 6,400,416 | B1 * | 6/2002 | Tomasz ..................... 348/654 |
| 6,501,510 | B1 * | 12/2002 | Moon ......................... 348/553 |
| 6,714,261 | B1 * | 3/2004 | Matsuura .................... 348/731 |
| 6,766,528 | B1 * | 7/2004 | Kim et al. ................... 725/113 |

* cited by examiner

Primary Examiner—David L Ometz
Assistant Examiner—Jean W Désir
(74) Attorney, Agent, or Firm—Birch, Stewart, Kolasch & Birch, LLP

(57) ABSTRACT

A digital broadcasting method and apparatus providing digital broadcast signals based on different broadcasting standards to the audiences. The digital broadcasting apparatus includes a plurality of tuners which can receive the broadcast signals based on the different broadcasting standards. A data broadcast signal based on one broadcasting standard is received through one of the tuners and displayed. In a state that a data broadcast signal based on one broadcasting standard is being displayed, the data broadcast signal being displayed is replaced with the data broadcast signal based on the different broadcasting standard in response to the audience's request. Accordingly, the audiences can view the desired data broadcast signal without regard to the broadcasting standards.

8 Claims, 4 Drawing Sheets

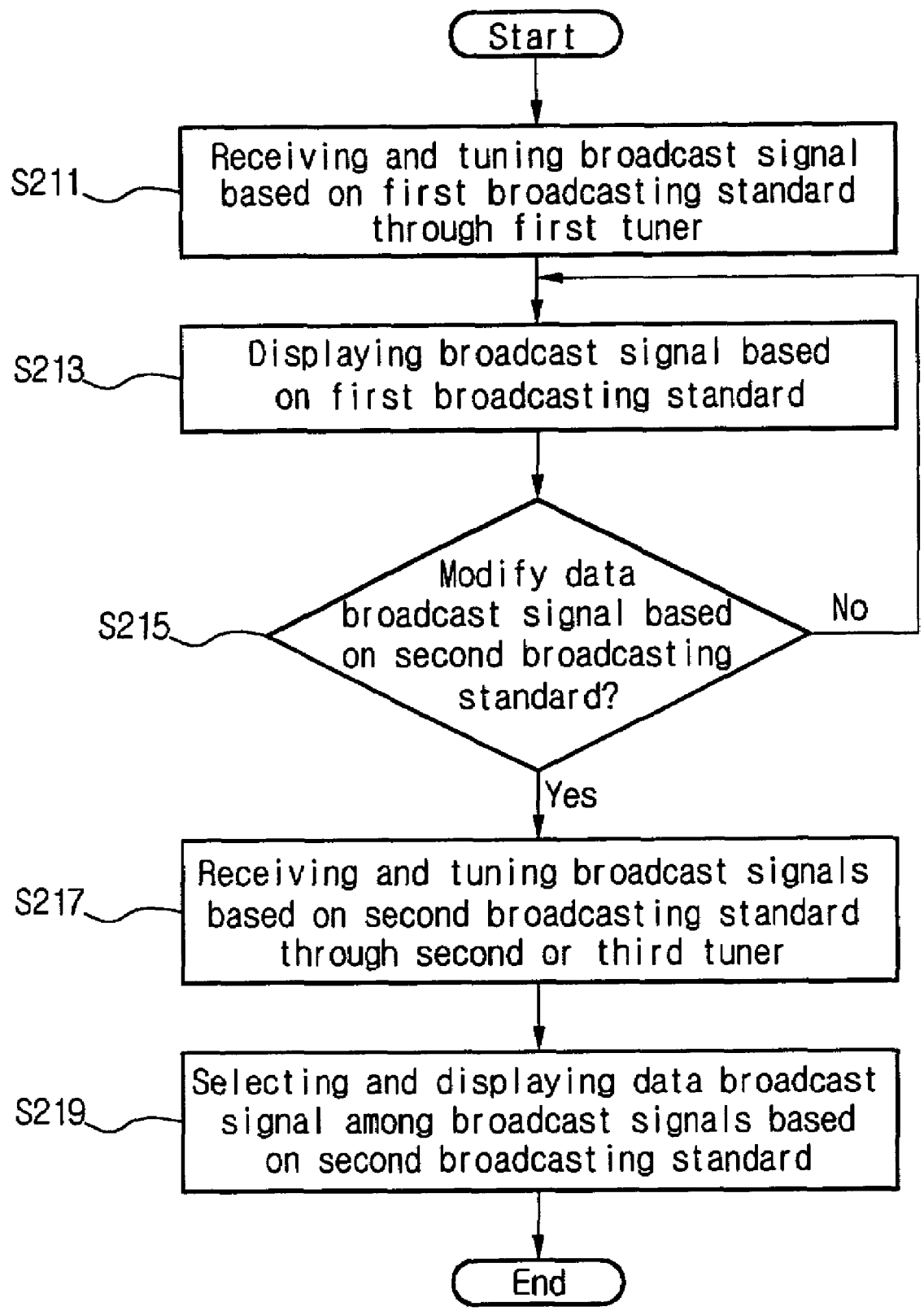

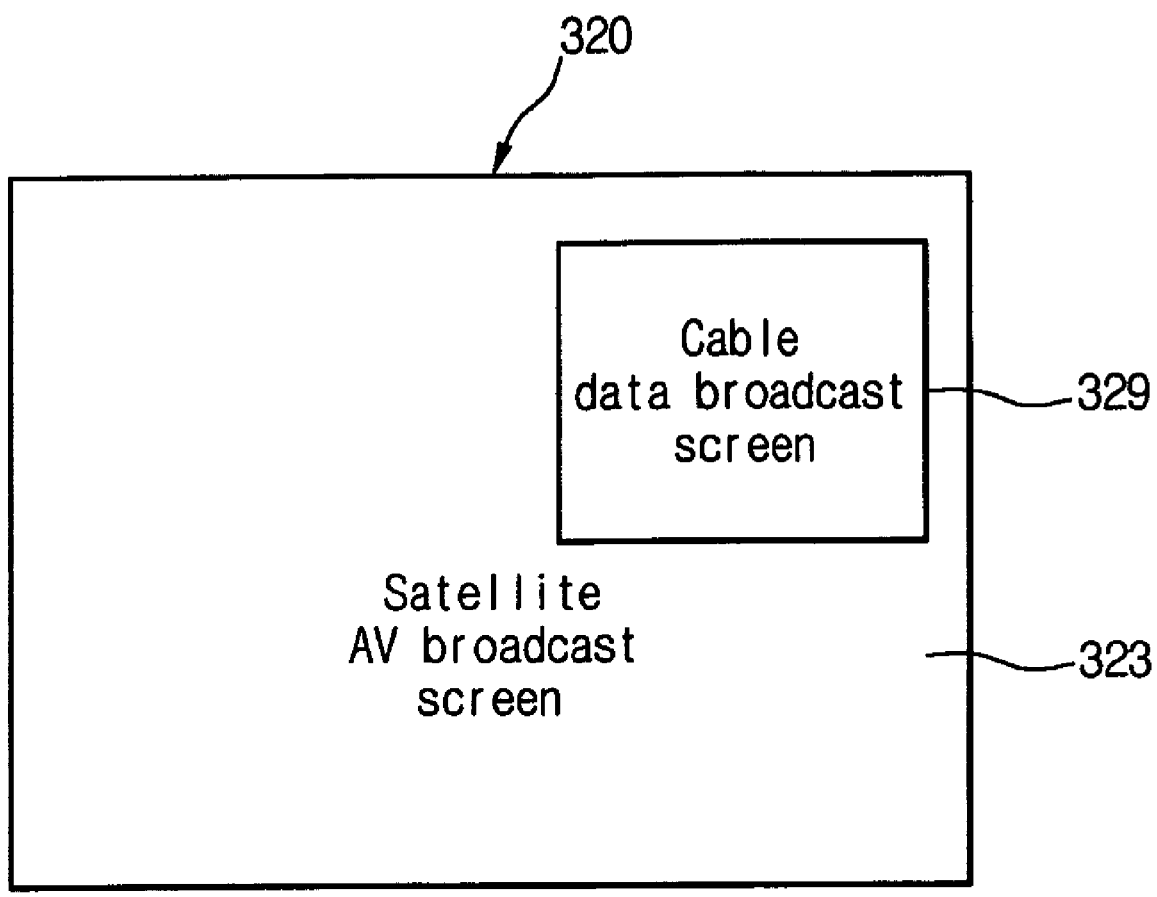

METHOD AND APPARATUS FOR DISPLAYING DIGITAL BROADCASTING

This nonprovisional application claims priority under 35U.S.C. § 119(a) on Patent Application No(s). 10-2002-0069071 filed in KOREA on Nov. 8, 2002, which is(are) herein incorporated by reference.

BACKGROUND OF THE INVENTION

1. Field of the Invention

The present invention relates to a digital television, and more particularly, to a method and apparatus for displaying digital broadcasting in which data broadcast signals based on different broadcasting standards are displayed regardless of broadcasting standards.

2. Description of the Related Art

Compared with an analog broadcasting according to the related art, a digital broadcasting provides higher quality audio/video and also provides various and convenient functions including data broadcasting, interactive communication, and the like.

A transport stream transmitted in the digital broadcasting can include audio/video broadcast signal (hereinafter, referred to as AV broadcast signal) and data broadcast signal. Here, the data broadcast signal can be made based on markup such as XDML of hypertext markup language (HTML) and digital TV application software environment (DASE) of advanced television enhancement forum (ATVEF) or based on Java such as Xlet of DASE.

While viewing the AV broadcast signals, the audience can obtain additional information related to television programs, shop products, search interesting information such as weather, securities, news and the like, and transact banking affairs at home.

Additionally, the audience can personally participate in a live quiz program and get a prize according to an acquired score, or actively participate in television programs and provide news articles, or reflect their opinions in broadcasting programs.

Accordingly, such a digital broadcasting can provide various types of data as well as audio or video.

Meanwhile, the digital broadcasting is classified into a terrestrial broadcasting, a satellite broadcasting and a cable broadcasting according to the broadcasting standards.

Currently, the broadcasting standards differ from country to country. For example, the United States determines to employ a digital system in a next generation television called an advanced television (ATV). In Europe, many projects such as HD DIVINE of Sweden broadcasting, SPECTRE of England and DIAMOND of France broadcasting are in progress.

The digital television is a next generation television system interfacing with B-ISDN or computer networks. Also, researches on the digital television are made actively.

An advanced television systems committee (ATSC) broadcasting system is the terrestrial broadcasting standard and employs an advanced television systems committee—digital TV application software environment (ATSC-DASE) to support the digital broadcasting.

A digital video broadcasting (DVB) system is the satellite broadcasting standard and settles down as a worldwide standard for the digital broadcasting of video, audio and data. A digital video broadcasting—multimedia home platform (DVB-MHP) can be employed to support the digital broadcasting.

An open cable applications platform (OCAP) system which is the cable broadcasting standard is the basis of application production for a duplex service in the cable broadcasting. Since the OCAP system can provide web-based services, the OCAP system supports a more advanced duplex services.

In the related art, one digital broadcasting tuner is provided in one digital television set (e.g., a settop box). Accordingly, in the digital broadcasting, broadcast signals based on only one broadcasting standard are received through a digital broadcasting tuner, and then the digital broadcast signals are displayed on a screen together with the AV broadcast signals. At this time, the data broadcast signals are signals transmitted together with the AV broadcast signals received through the digital broadcasting tuner.

For example, as shown in FIG. 1, if the digital broadcasting tuner can tune the terrestrial broadcasting, the broadcast signals based on the terrestrial broadcasting standard alone are received through the digital broadcasting tuner and displayed on a screen 10. In other words, among the broadcast signals, the AV broadcast signals are displayed on a terrestrial AV broadcast screen 12 and the data broadcast signals are displayed on a terrestrial data broadcast screen 14.

According to the related art, since broadcast signals based on one broadcasting standard alone are received through one receiver, the audience should purchase an additional receiver so as to view the broadcast signals based on other broadcasting standards. As a result, the audience cannot view the broadcast signals based on other broadcasting standards if they do not purchase the additional receiver due to a purchase expenses of the receiver.

Particularly, to the audience viewing the data broadcast signals based on one broadcasting standard (e.g., the terrestrial broadcasting standard) through the digital broadcasting tuner, it is inconvenient since they can view only the data broadcast signals based on one broadcasting standard.

For example, in case the data broadcasting based on a current broadcasting standard is related to stocks and the audience cannot acquire desired information, the audience wants to acquire information on the stocks in the data broadcasting based on other broadcasting standards. In this case, according to the related art, the audiences are not satisfied since the audiences can view only the data broadcast signals based on the predetermined broadcasting standard, so that an activation of the data broadcasting is degraded.

SUMMARY OF THE INVENTION

Accordingly, the present invention is directed to a method and apparatus for displaying digital broadcasting that substantially obviates one or more problems due to limitations and disadvantages of the related art.

It is an object of the present invention to provide a digital broadcasting display method in which the audience selectively watches broadcast signals based on different broadcasting standards, specifically data broadcast signals.

It is another object of the present invention to provide a digital broadcasting display apparatus which can receive data broadcast signals based on different broadcasting standards so as to selectively watch data broadcast signals.

Additionally advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to a first embodiment of the present invention, a digital broadcasting display method comprises the steps of: displaying AV broadcast signal and data broadcast signal based on one broadcasting standard; tuning data broadcast signal based on another broadcasting standard in response to a request for a modification of the data broadcast signal being displayed; and displaying the tuned data broadcast signal based on the another broadcasting standard.

According to a second embodiment of the present invention, a digital broadcasting display method comprises the steps of: displaying an AV broadcast signal based on one broadcasting standard; tuning a data broadcast signal based on another broadcasting standard selected by an audience; and displaying the tuned data broadcast signal based on the another broadcasting standard.

According to a third embodiment of the present invention, a digital broadcasting display method comprises the steps of: tuning broadcast signals based on different broadcasting standards, the broadcast signals being received through a plurality of tuning means; displaying a broadcast signal tuned by one tuner among the plurality of tuning means; and displaying a broadcast signal received through another tuner among the plurality of tuning means in response to a request for a modification of the broadcast signal being displayed.

According to a fourth embodiment of the present invention, a digital broadcasting display apparatus comprises: a plurality of tuning means for selectively tuning a plurality of broadcast signals received according to different broadcasting standards; a display means for displaying the broadcast signal tuned by one tuning means among the plurality of tuning means; and a control means for controlling the displaying of the broadcast signal received through another tuning means in response to a request for a modification of the data broadcast signal being displayed.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings:

FIG. 3 is a flowchart illustrating a digital broadcasting display method according to a preferred embodiment of the present invention; and FIGS. 4A to 4C are exemplary views of screens displaying broadcast signals based on different broadcasting standards according to a preferred embodiment of the present invention.

DETAILED DESCRIPTION OF THE PREFERRED EMBODIMENTS

Reference will now be made in detail to a preferred embodiment of the present invention with reference to the attached drawings.

Figure 1:
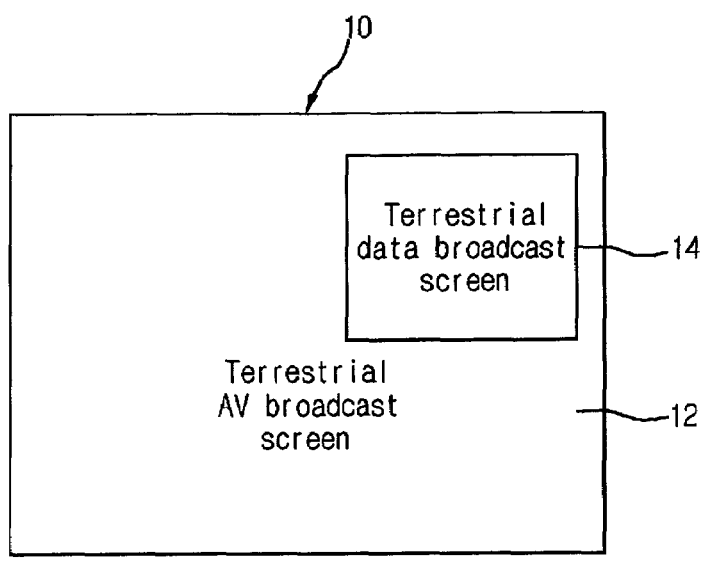
FIG. 1 is an exemplary view of a screen displaying a broadcast signal based on one broadcasting standard according to the related art.
Figure 2:
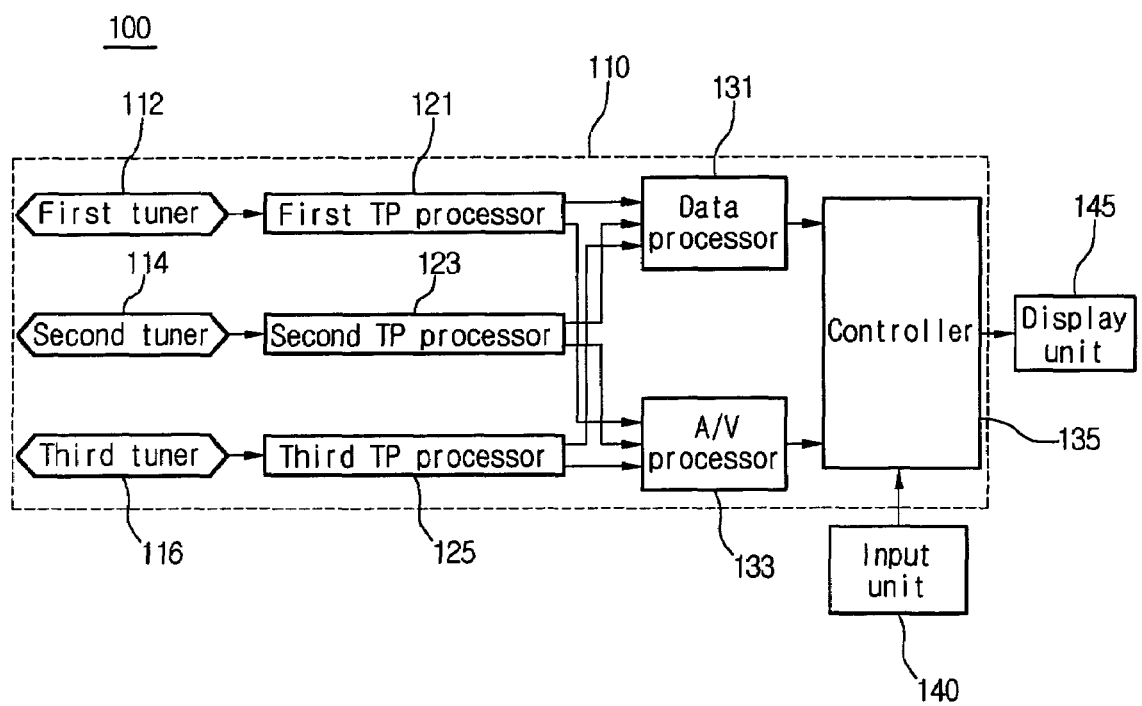
FIG. 2 is a schematic view of a digital broadcasting display apparatus according to a preferred embodiment of the present invention.

FIG. 2 is a schematic view of a digital broadcasting display apparatus according to a preferred embodiment of the present invention.

Referring to FIG. 2, the digital broadcasting display apparatus 100 includes a composite receiver 110, a display unit 145 and an input unit 140. The display unit 145 is a device for displaying a digital broadcast signal on a screen and may include LCD, PDP, projection, etc.

The input unit 140 is a device for inputting commands associated with the data broadcasting based on a broadcasting standard desired by the audience. The input unit 140 may include a remote controller.

The composite receiver 110 can be installed inside a digital television set. Also, the composite receiver 110 can be installed outside the digital television set by making the receiver in a form of a settop box.

The composite receiver 110 includes a plurality of tuners, i.e., a first tuner 112, a second tuner 114 and a third tuner 116. Broadcast signals based on different broadcasting standards can be received through the plurality of tuners. As an example, the first, second and third tuners 112, 114 and 116 can be implemented to receive broadcast signals based on a terrestrial broadcasting standard, a satellite broadcasting standard and a cable broadcasting standard, respectively. Additionally, as another example, the first, second and third tuners 112, 114 and 116 can be used to receive broadcast signals based on the satellite broadcasting standard, the cable broadcasting standard, and the terrestrial broadcasting standard, respectively.

The broadcast signals received through the plurality of tuners according to the different broadcasting standards are tuned when the audience requests the TV watching.

The composite receiver 110 includes a plurality of TP processors for extracting AV broadcast signal and data broadcast signal from the broadcast signals received through the plurality of tuners according to the different broadcasting standards. Specifically, the plurality of TP processors includes: a first TP processor 121 for extracting AV broadcast signal and data broadcast signal from the broadcast signals provided from the first tuner 112; a second TP process 123 for extracting AV broadcast signal and data broadcast signal from the broadcast signals provided from the second tuner 114; and a third TP processor 125 for extracting AV broadcast signal and data broadcast signal from the broadcast signals provided from the third tuner 116.

At this time, the AV broadcast signals and the data broadcast signals extracted by the TP processors are provided to an A/V processor 133 and the data processor 131, respectively.

The A/V processor 133 and the data processor 131 are implemented to process the broadcast signals based on the different broadcasting standards.

Additionally, data processors and A/V processors can be provided to correspond to the respective TP processors. In this example, three data processors and three A/V processors are provided.

The number of the data processor and the A/V processor can be changed according to the implementation methods. An important thing is that the data processor and the A/V processor are implemented to process the AV broadcast signals and the data broadcast signals extracted from the TP processors.

In other words, The A/V processor 133 processes the extracted AV broadcast signals to reconstruct original AV broadcast signals. The data processor 131 processes the extracted data broadcast signals to reconstruct original data broadcast signals.

The reconstructed AV broadcast signals and data broadcast signals are displayed on the display unit 145 under a control of the controller 135.

The controller 135 controls the displaying of the broadcast signals received through the tuner which corresponds to the audience's request.

For example, it is assumed that the first, second and third tuners 112, 114 and 116 receive the broadcast signals based on the terrestrial broadcasting standard, the satellite broadcasting standard and the cable broadcasting standard, respectively.

If a command is inputted through the input unit 140 so as to view the AV broadcast signal among the broadcast signals based on the terrestrial broadcasting standard, the controller 135 recognizes the input of the command and operates the first tuner 112, so that the broadcast signal based on the terrestrial broadcasting standard is received.

The broadcast signal received through the first tuner 112 according to the terrestrial broadcasting standard are reconstructed into the original A/V broadcast signal and data broadcast signal by the first TP processor 121, the A/V processor 133 and the data processor 131.

At this time, among the reconstructed AV broadcast signals and data broadcast signals, the AV broadcast signal desired by the audience is displayed on the display unit 145 under a control of the controller 135.

If the audience requests the data broadcast signal based on the terrestrial broadcasting standard while displaying the AV broadcast signal based on the terrestrial broadcasting standard, the reconstructed data broadcast signal is displayed on the display unit 145 under a control of the controller 135.

If the audience requests data broadcast signal based on other broadcasting standard (e.g., the satellite broadcasting standard), the controller 135 recognizes the audience's request and operates the second tuner 114. Therefore, the second tuner 114 receives and tunes the broadcast signal based on the satellite broadcasting standard.

Then, the tuned broadcast signal is reconstructed into the original AV broadcast signal and data broadcast signal through the second TP processor 123, the A/V processor 133 and the data processor 131.

At this time, the controller 135 selects desired data broadcast signal among the AV broadcast signals and data broadcast signals. The selected broadcast signal is displayed on the display unit 145 under a control of the controller 135.

As described above, the controller 135 can control the displaying of AV broadcast signal alone or both AV broadcast signal and data broadcast signal based on one broadcasting standard according to the audience's request, or the displaying of AV broadcast signal and data broadcast signal based on other broadcasting standard additionally requested by the audience. At this time, the AV broadcast signal based on one broadcasting standard and the data broadcast signal based on other broadcasting standard can be simultaneously displayed on one screen in a manner of picture in picture (PIP) or picture out of picture (POP).

If there is the audience's additional request when the data broadcast signal based on one broadcasting standard is being displayed, the data broadcast signal based on one broadcasting standard can be replaced with the data broadcast signal based on other broadcasting standard under a control of the controller 135.

In this case, AV broadcast signal based on the satellite broadcasting standard, which is not selected by the controller 135, may be discarded or stored.

If a new broadcasting standard is provided in the future, the present invention can be implemented by adding a tuner capable of receiving broadcast signals based on the new broadcasting standard. Accordingly, the apparatus with the tuner for the new broadcasting standard is contained within the scope of the present invention.

An operation of the digital broadcasting display apparatus constructed as above will be described below.

FIG. 3 is a flowchart showing a digital broadcasting display method according to a preferred embodiment of the present invention.

Referring to FIG. 3, using the input unit 140, the audience requests to the composite receiver 110 the digital broadcasting received through the first tuner 112. The composite receiver 110 receives and tunes the broadcast signals based on the first broadcasting standard in response to the audience's request (S211). In the following example, it is assumed that the first broadcasting standard is the terrestrial broadcasting standard.

The tuned broadcast signals are reconstructed into the original AV broadcast signal and data broadcast signal through the first TP processor 121, the A/V processor 133 and the data processor 131.

The reconstructed AV broadcast signal and data broadcast signal are displayed differently according to the specification requested by the audience (S213).

In other words, if the audience requests the AV broadcast signal alone, the reconstructed AV broadcast signal alone is displayed. If the audience requests both the AV broadcast signal and the data broadcast signal, the reconstructed data broadcast signal is displayed together with the reconstructed AV broadcast signal.

In a state that the broadcast signal based on the first broadcasting standard is being displayed, the audience can view the broadcast signal based on the second broadcasting standard, specifically the data broadcast signal.

In other wards, if the audience requests through the input unit 140 the modification from the data broadcast signal based on the first broadcasting standard to the data broadcast signal based on the second broadcasting standard (e.g., the satellite broadcasting standard or the cable broadcasting standard), the composite receiver 110 checks the audience's request (S215).

As the checking result, if there is the request for the broadcast signal based on the second broadcasting standard, the composite receiver 110 receives and tunes the data broadcast signal based on the second broadcasting standard through the second tuner 114 or the third tuner 116 (S217).

For example, if the second broadcasting standard is the satellite broadcasting standard, the broadcast signal is received through the second tuner 114, and if the second broadcasting standard is the data broadcasting standard, the broadcast signal is received through the third tuner 116.

The tuned broadcast signal based on the second broadcasting standard is reconstructed into the original AV broadcast signal and data broadcast signal through the second or third TP processor 123 or 125, the A/V processor 133 and the data processor 131.

The composite receiver 110 selects and displays desired data broadcast signal among the AV broadcast signals and data broadcast signals (S219).

Figure 4A:
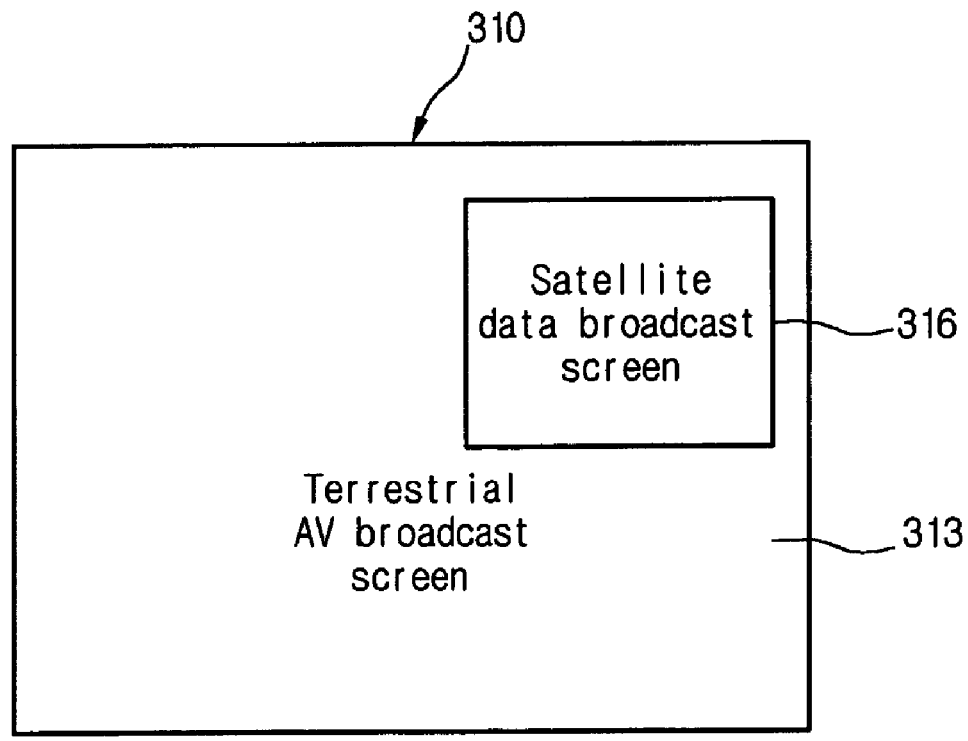
Figure 4B:
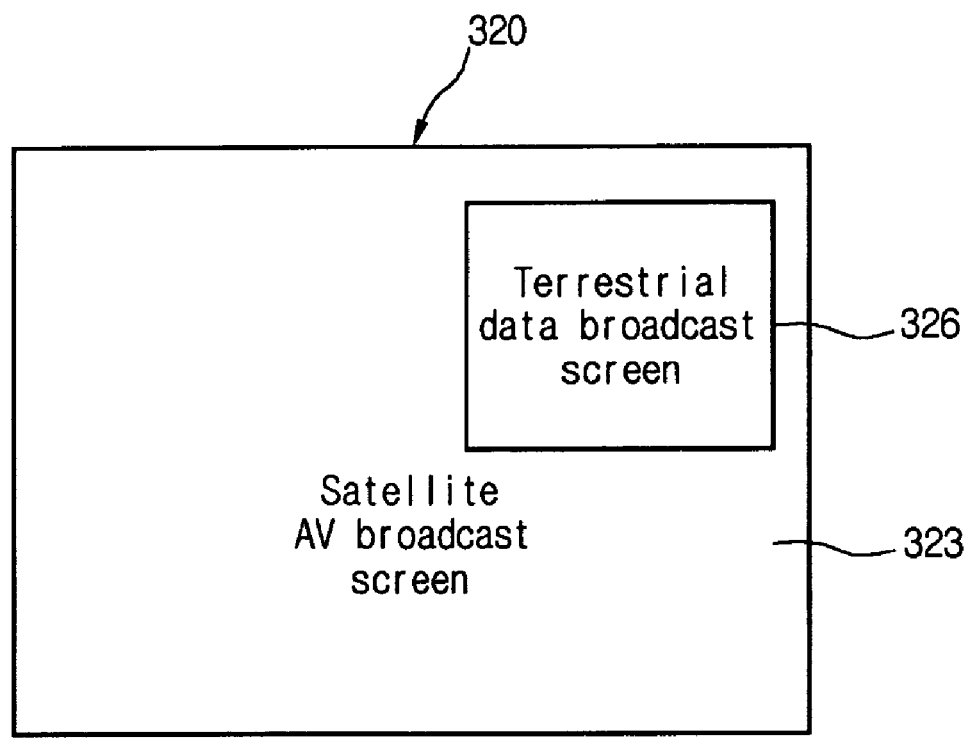

FIGS. 4A to 4C are exemplary views of screens displayed on the display unit 145. In the screen 310, the AV broadcast signal based on the terrestrial broadcasting standard is displayed on the terrestrial AV broadcast screen 313 and the data broadcast signal based on the satellite broadcasting standard is displayed on the satellite data broadcast screen 316. At this time, in a state the data broadcast signal based on the terrestrial broadcasting standard is originally being displayed on the satellite data broadcast screen 316, the data broadcast signal based on the satellite broadcasting standard instead of the terrestrial broadcasting standard is displayed on the satellite data broadcast screen 316 if there is the audience's request.

Meanwhile, as shown in FIGS. 4B and 4C, the audience can view the data broadcast signal based on the different broadcasting standard (e.g., the terrestrial broadcasting standard or the cable broadcasting standard) while viewing the broadcast signal based on the satellite broadcasting standard.

FIG. 4B illustrates a screen in which both the AV broadcast signal based on the satellite broadcasting standard and the data broadcast signal based on the terrestrial broadcasting standard are displayed on one screen. FIG. 4C illustrates a screen in which both the AV broadcast signal based on the satellite broadcasting standard and the data broadcast signal based on the cable broadcasting standard are displayed on one screen.

In other words, if the audience requests for the broadcast signal based on the satellite broadcasting standard at first, the AV broadcast signal or both the AV broadcast signal and data broadcast signal based on the satellite broadcasting standard, which is/are received through the second tuner 114, are displayed on the screen 320. Here, the AV broadcast signal is displayed on the satellite AV broadcast screen 323.

Referring to FIG. 4B, if the audience requests for the data broadcast signal based on the terrestrial broadcasting standard, the data broadcast signal based on the satellite broadcasting standard, which is previously being displayed, is replace with the data broadcast signal based on the terrestrial broadcasting standard, which is received through the first tuner 112. Consequently, the data broadcast signal based on the terrestrial broadcasting standard is displayed on the terrestrial data broadcast screen 326.

Referring to FIG. 4C, if the audience requests for the data broadcast signal based on the cable broadcasting standard, the data broadcast signal based on the satellite broadcasting standard, which is previously being displayed, is replace with the data broadcast signal based on the cable broadcasting standard, which is received through the third tuner 116. Consequently, the data broadcast signal based on the cable broadcasting standard is displayed on the cable data broadcast screen 329.

According to the digital broadcasting display method of the present invention, the data broadcast signal based on one broadcasting standard, which is being displayed, is replaced with the data broadcast signal based on other broadcasting standard requested by the audience.

Accordingly, in case the audience may not obtain desired information from the data broadcast signal which is being displayed, it is possible for the audience to obtain the desired information by displaying the data broadcast signal based on other broadcasting standard at any time.

As described above, according to the digital broadcasting display method and apparatus of the present invention, there are provided a plurality of tuners that can receive broadcast signals based on different broadcasting standards. Also, the audience can view desired data broadcast signal without regard to the AV broadcast signal being displayed. Therefore, the audience's option can be expanded more widely and the audience's reliability of the digital television can be improved remarkably.

Accordingly, the audience can view the data broadcast signal based on other broadcasting standard while viewing the AV broadcast signal based on a specific broadcasting standard, thereby meeting the audience's demands. As a result, the digital broadcasting can be made active due to an increase in the purchasing power of digital television.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for displaying a digital broadcasting, the method comprising:

displaying an audio/video (A/V) broadcast signal and a first data broadcast signal based on an Open Cable based broadcasting standard;

tuning to a second data broadcast signal based on an ATSC (Advanced Television Systems Committee) based broadcasting standard different than the Open Cable based broadcasting standard in response to a request for a modification of the first data broadcast signal being displayed; and displaying the tuned second data broadcast signal based on the ATSC based broadcasting standard, wherein when the A/V broadcast signal is a first A/V broadcast signal including the first data broadcast signal, the first A/V broadcast signal is received and tuned through a first tuner, wherein when the A/V broadcast signal is a second A/V broadcast signal including the second data broadcast signal, the second A/V broadcast signal is received and tuned through a second tuner, wherein when the first A/V broadcast signal is received and tuned through the first tuner, a first transport packet processor connected to an output of the first tuner extracts the first data broadcast signal from the first A/V broadcast signal, and when the second A/V broadcast signal is received and tuned through the second tuner, a second transport packet processor connected to an output of the second tuner extracts the second data broadcast signal from the second A/V broadcast signal, wherein a data processor connected to the first and second transport packet processors processes the corresponding first and second data broadcast signals, and an A/V processor connected to the first and second transport packet processors processes the corresponding first and second A/V broadcast signals such that any one of the first and second data broadcast signals can be displayed together with any one of the first and second A/V broadcast signals, and wherein the tuning step tunes to the second data broadcast signal based on the ATSC based broadcasting standard without a user requesting for information related to the first A/V broadcast signal.

2. The method according to claim 1, wherein the first A/V broadcast signal based on the Open Cable based broadcasting standard and the second data broadcast signal based on the ATSC based broadcasting standard are simultaneously displayed on one screen in a picture in picture (PIP).

3. A digital broadcasting display method comprising:

receiving and tuning at least one of a first and second audio/video (A/V) broadcast signals through a corresponding first and second tuners, said first and second A/V broadcast signals being based on corresponding Open Cable based broadcasting and ATSC (Advanced Television Systems Committee) based broadcasting standards that are different from each other;

extracting first and second data broadcast signals from the first and second A/V broadcast signals via first and second transport packet processors connected to the first and second tuners, respectively;

processing the first and second A/V broadcast signals with an A/V processor connected to the first and second transport packet processors;

processing the first and second data broadcast signals with a data processor connected to the first and second transport packet processors; and displaying any one of the first and second A/V broadcast signals with any one of the first and second data broadcast signals, wherein the second A/V broadcast signal is displayed without a user requesting for information related to the first A/V broadcast signal, and the first A/V broadcast signal is displayed without a user requesting for information related to the second A/V broadcast signal.

4. The method according to claim 3, wherein the first A/V broadcast signal based on the Open Cable based broadcasting standard and the second data broadcast signal based on the ATSC based broadcasting standard are simultaneously displayed on one screen in a picture in picture (PIP).

5. A digital broadcasting display method comprising:

tuning first and second audio/video (A/V) broadcast signals based on different Open Cable based broadcasting and ATSC (Advanced Television Systems Committee) based broadcasting standards, the first and second A/V broadcast signals being received and tuned through first and second tuners, respectively;

extracting first and second data broadcast signals from the first and second A/V broadcast signals via first and second transport packet processors connected to the first and second tuners, respectively; and displaying, via a display unit connected to the first and second transport packet processors, any one of the first and second A/V broadcast signals with any one of the first and second data broadcast signals, wherein the second A/V broadcast signal is displayed without a user requesting for information related to the first A/V broadcast signal, and the first A/V broadcast signal is displayed without a user requesting for information related to the second A/V broadcast signal.

6. The method according to claim 5, further comprising tuning the second broadcast signal received through the second tuner in response to a request for a modification of the first and second A/V broadcast signals being displayed.

7. The method according to claim 5, wherein the first A/V broadcast signal tuned by said first tuner and the second data broadcast signal received through said second tuner are simultaneously displayed on one screen in a manner of picture in picture (PIP).

8. An apparatus for displaying a digital broadcast signal, the apparatus comprising:

at least first and second tuners configured to selectively tune first and second audio/video (A/V) broadcast signals received according to different Open Cable based broadcasting and ATSC (Advanced Television Systems Committee) based broadcasting standards, respectively;

first and second transport packet processors respectively connected to the first and second tuners and configured to extract first and second data broadcast signals from the first and second A/V broadcast signals;

an A/V processor connected to the first and second transport packet processors and configured to process the first and second A/V broadcast signals;

a data processor connected to the first and second transport packet processors and configured to process the first and second data broadcast signals; and a controller connected to the first and second transport packet processors and configured to display on a display any one of the first and second data broadcast signals with any one of the first and second A/V broadcast signals in response to a request from a user, wherein the controller displays on the display the second data broadcast signal without a user requesting for information related to the first data broadcast signal, and the controller displays on the display the first data broadcast signal without a user requesting for information related to the second data broadcast signal.

* * * * *